July 31, 1928.

A. DOMENICO

BRAKE DEVICE

Filed July 18, 1927

ANTHONY DOMENICO
INVENTOR

BY Victor J. Evans
ATTORNEY

WITNESS:

July 31, 1928.
A. DOMENICO
BRAKE DEVICE
Filed July 18, 1927
1,678,692
2 Sheets-Sheet 2
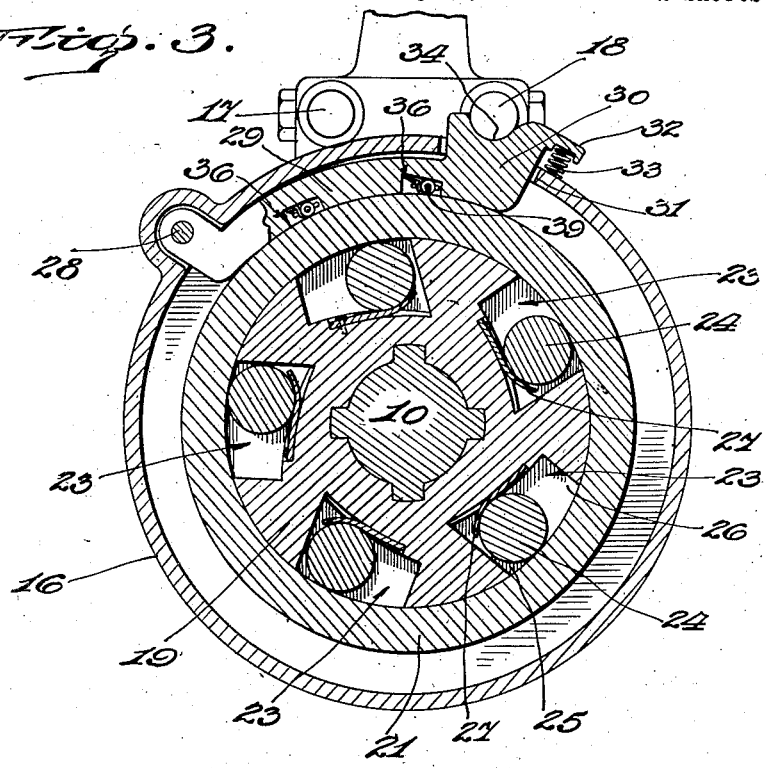
Fig. 3.
Fig. 4.
Fig. 5.
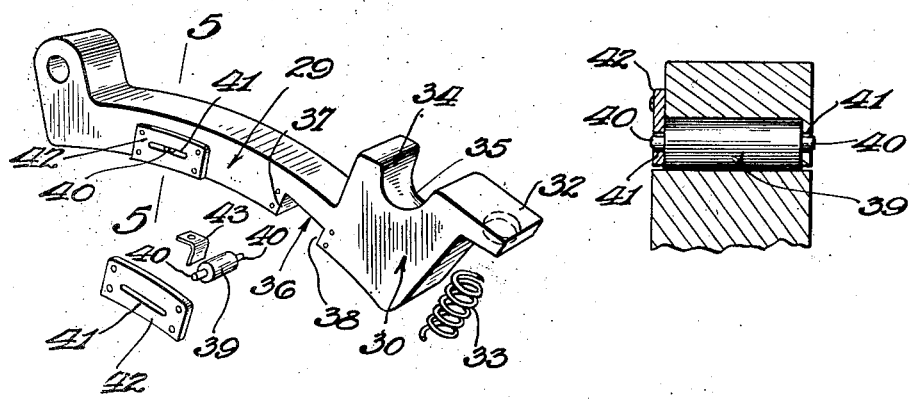
ANTHONY DOMENICO
INVENTOR
BY Victor J. Evans
ATTORNEY
WITNESS:

Patented July 31, 1928.

1,678,692

UNITED STATES PATENT OFFICE.

ANTHONY DOMENICO, OF BROOKLYN, NEW YORK.

BRAKE DEVICE.

Application filed July 18, 1927. Serial No. 206,754.

This invention relates to improvements in brake devices.

The primary object of the invention resides in a brake device for application to a rotatable part for automatically preventing accidental rotation of the part in one direction but which may be controlled for permitting rotation in either direction when desired.

Another object of the invention is to provide a brake device for automobiles in which the same is mounted on some rotatable driving part thereof, such as the driven shaft, rear axle or the like, to freely permit rotation of the part in a forward direction but which automatically locks to prevent rotation of the part in an opposite direction, such as for instance, when an automobile is ascending a hill and it becomes necessary to shift from high gear into a lower gear. Under such conditions, the device will automatically operate to prevent backward movement of the automobile during the interval of manually shifting the gears.

Another object is to provide a brake device which is automatic and positive in its actions and simple in construction and operation.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 3 is a vertical transverse sectional view on the line 3—3 of Figure 1.

Figure 4 is a perspective view of one of the brake elements with parts being shown in a separated condition.

Figure 5 is a detail vertical sectional view on the line 5—5 of Figure 4.

Figure 1:
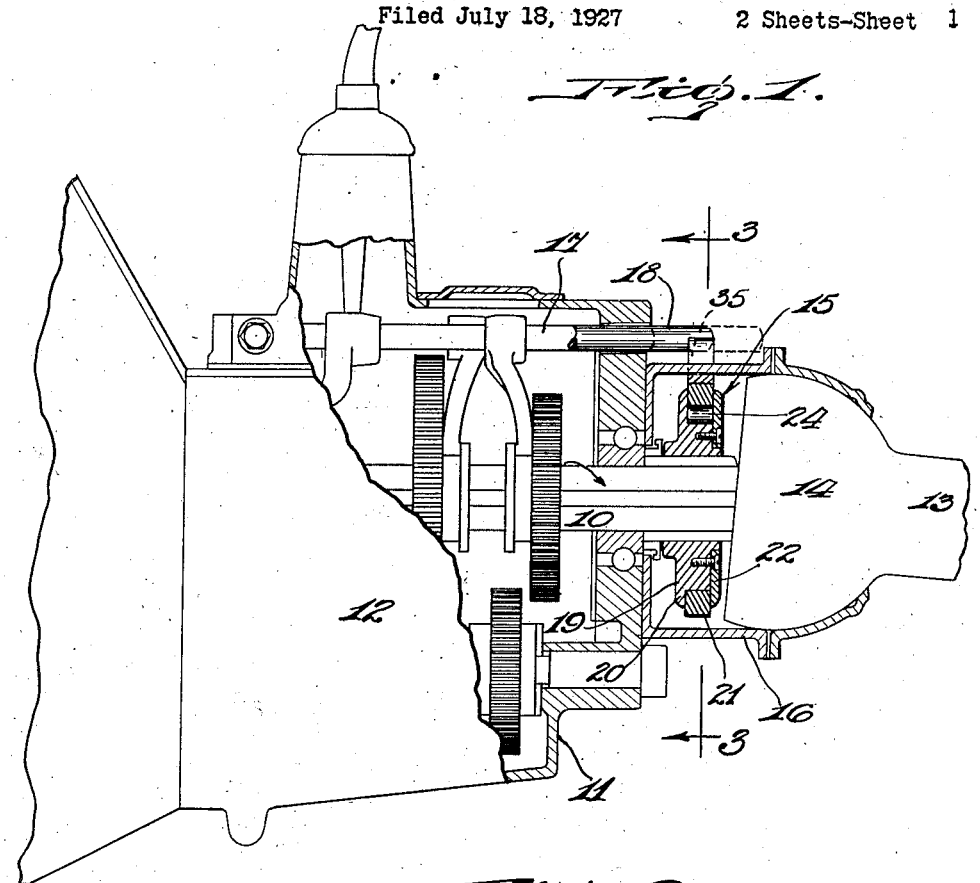
Figure 1 is a vertical sectional view through a portion of an automobile transmission showing my improved brake device in position thereon.
Figure 2:
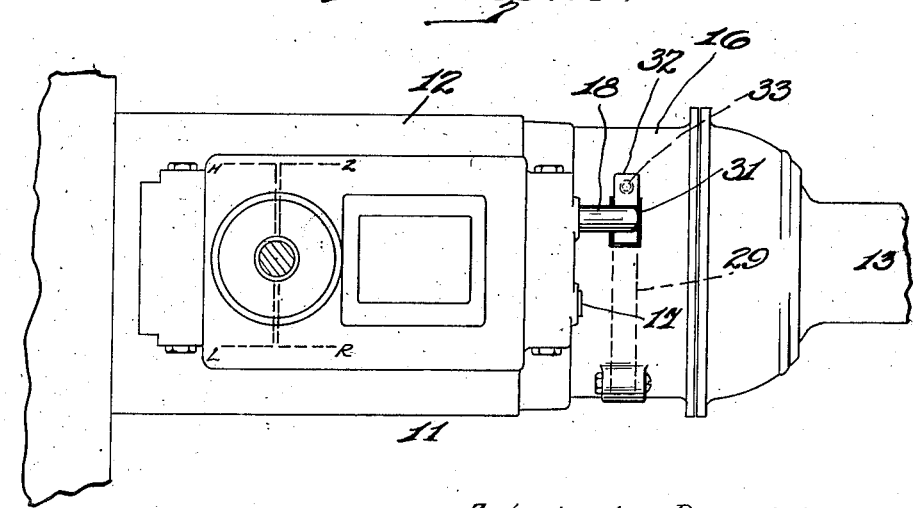
Figure 2 is a top plan view thereof.

Referring more particularly to the drawings, the reference numeral 10 designates a drive shaft, and in the present instance, I have chosen to illustrate my invention in connection with the drive shaft of an automobile transmission 11 which includes a transmission housing 12, through which the drive shaft 11 extends and which drive shaft is operatively connected to a driven part or shaft 13 by a universal joint 14. My improved brake device 15 is shown applied to the drive shaft adjacent the universal joint and is enclosed within the universal housing 16. The transmission also includes the usual gear shifting shafts 17 and 18, the shaft 18 being slightly longer than the shaft 17 so as to extend slightly beyond the end of the transmission housing when the same is in a forward gear position or neutral, but which is movable to a retracted position when the gears of the transmission are in reverse for a purpose to be presently explained. The gear shifting shaft 17 is actuated for moving the gears of the transmission to either high or intermediate gear, while the gear shifting shaft 18 controls the movement of the gears to low and reverse positions. This shifting is well known in the art so that a detailed explanation of the same is not believed necessary.

My improved brake device which is shown in its entirety as at 15 comprises a rotor disk or body 19 keyed to the drive shaft 10 for rotation in a forward direction therewith as indicated by arrows in Figure 1 of the drawings. A flange 20 is provided on the inner periphery of the rotor against which a ring 21 is held by a removable plate 22 fixed to the opposite side face of the rotor. The periphery of the rotor is provided with equi-distantly spaced recesses 23, the inner periphery of the ring serving to enclose the outer open sides of the recesses for housing steel balls or rollers 24. The bottoms of the recesses are eccentric with respect to the axis of the shaft 10 to provide an enlarged portion 25 and a restricted portion 26, the balls being normally seated in flat springs 27, adjacent the enlarged portions of the recesses due to the tendency of the rotor to rotate in the direction of the arrows.

Pivoted within the housing 16 as at 28 is a shoe 29 and which is curved to fit the contour of the ring 20. The shoe has a head 30 which extends upward through a slot 31 in the housing 16 and has a lip 32 overlying the housing between which an expansion spring 33 is interposed to exert a tendency upon the shoe to move away from the ring 20. The head 30 is disposed in the path of outward movement of the gear shifting rod 18 and is provided with a seat 34 therefor which is rounded at its inner end as at 35 for guiding the end of the shifting rod during its outward movement when the shoe is in a lifted position.

For the purpose of setting up a braking action between the shoe and the ring 30 during a reverse turning movement of the ring with the rotor when the balls 24 move to the restricted portion of their recesses, I provide recesses 36 in the underside of the shoe and which are provided with an enlarged end 37 and a reduced or restricted end 38 for slidably receiving rollers 39 having trunnions 40 at opposite ends thereof for reception in slots 41 in the closed side of the recesses and in the cover plates 42 which are bolted to the outer face of the shoe for closing the outer open sides of the recesses. A spring 43 is provided for yieldingly limiting movement of the rollers 39 toward the enlarged portion 37 of the recesses.

In operation, we shall presume that the transmission is in any position other than in reverse gear, at which time the drive shaft 10 is rotating for imparting a forward driving movement to an automobile. When in this position, the shoe 29 is being held down upon the ring 20 by reason of the extended gear shifting shaft 18, which seats upon the seat 34. As long as the shaft 10 rotates in a direction to impart a forward driving movement to the part 13, the shaft is free to rotate as is the rotor 19 and ring 20 which only frictionally engages the rotor. However, should an automobile be ascending a hill and it becomes necessary to shift to a lower gear, the brake device serves to prevent rearward movement of the automobile during the disengagement of the clutch and the gear shifting operation, for should the automobile start backward, a reverse turning movement will be imparted to the shaft 10 and rotor 19 causing the balls 24 to jam against the inner periphery of the ring and lock the ring to the rotor. As the ring begins to turn in a reverse direction, the rollers 39 of the shoe jam with the ring, thus locking the ring against further reverse movement. When locked, the drive shaft cannot rotate in a reverse direction, therefor backward movement of the automobile is prevented. Should it be desired to drive the automobile in a rearward direction, the gears are shifted to a reverse position at which time the gear shifting shaft 18 has moved inwardly and off the seat 34, whereupon the spring 33 lifts the shoe 29 away from the ring 20, at which time the ring and rotor may rotate in a direction opposite to that shown by the arrows without fear of the locking of the parts.

While I have shown my invention applied to the transmission of an automobile, I do not wish to limit myself thereto as it may be applied to other driven parts thereof if desired without departing from the spirit of my invention.

What is claimed as new is:—

1. In combination with a rotatable part, a rotor keyed thereto, a ring encircling said rotor, manually operated means for locking said ring against rotation in one direction, and automatic means for locking said rotor against movement with respect to said ring in one direction when said ring is locked.

2. In combination with a rotatable part, a rotor keyed thereto, a ring freely encircling said rotor, a shoe engageable with said ring, manually operated means for holding said shoe in engagement with said ring, locking means carried by said shoe and engaging said ring for locking the latter against rotation in one direction, and automatic locking means between said rotor and said ring for locking the former against rotation in the same direction.

3. In combination with the transmission mechanism of an automobile having a driving shaft and a gear shifting bar, a brake device including a rotor keyed to said driving shaft, a ring freely encircling said rotor, a shoe engageable with said ring and held in engagement therewith by said gear shifting bar when in an extended position, locking means carried by said shoe and engaging said ring for locking the latter against rotation in one direction, and automatic locking means between said rotor and said ring for locking the former against rotation in the same direction.

In testimony whereof I hereby affix my signature.

ANTHONY DOMENICO.